W. C. Grimes,

Spark Arrester,

No. 335. Reissued Dec. 25, 1855.

Witnesses:

J. E. Shaw

Shadrach C. Hodgett

Inventor:

Wm. C. Grimes

N. PETERS, PHOTO-LITHOGRAPHER, WASHINGTON, D. C.

UNITED STATES PATENT OFFICE.

WILLIAM C. GRIMES, OF PHILADELPHIA, PENNSYLVANIA.

IMPROVEMENT IN SPARK-ARRESTERS.

Specification forming part of Letters Patent No. 2,455, dated February 12, 1842; Reissue No. 835, dated December 25, 1855.

*To all whom it may concern:*

Be it known that I, WILLIAM C. GRIMES, of Philadelphia, in the State of Pennsylvania, late of York, in said State, have invented a new and improved mode of preventing the escape of sparks or igniited particles from the chimneys of locomotive-engines; and I do hereby declare that the following is a full and exact description thereof.

To prevent the escape of coal-sparks or ignited particles with the gaseous products discharged from the chimneys of locomotive-engines various methods have been essayed, but screens of woven wire or finely-perforated plates have been most generally adopted, and found to answer best in practice. This method, however, is obviously defective, inasmuch as a mere screen cannot be made to retain sparks of a diameter much, if any, less than its meshes or perforations, which, to prevent their becoming choked with soot or other matter, are necessarily of a size that allows of their emitting a dangerous shower of ignited particles. Hence it is manifest that the object can never be fully accomplished without the application of some principle which shall constantly tend to separate the sparks and particles, irrespective of their dimensions, from the gaseous current before it reaches the point of discharge. Three known principles of nature—viz., momentum, gravitation, and centrifugal force—may be applied to this purpose. Two of these—momentum and gravitation—have severally been essayed, but with unfavorable results, the influence of the former being but momentary, while that of the latter is too small to be available where particles so light are acted upon by a current so strong. It is therefore by centrifugal force only that a constant and sufficiently intense influence over particles so light can be obtained; and it is my peculiar application of this principle to this purpose that constitutes my invention, as hereinafter described.

My apparatus consists of a circular chamber, of suitable capacity, wherein the gaseous current and sparks are made rapidly to revolve by passing into the same in a tangential or oblique direction, so that the more violent the current so also will be the intensity of centrifugal force, which carries the sparks and all other matter heavier than the gases evolved out to and against the circular walls of the chamber, where they continue to rotate till consumed or pass out through proper openings into an exterior chamber or chambers.

Figure 1:
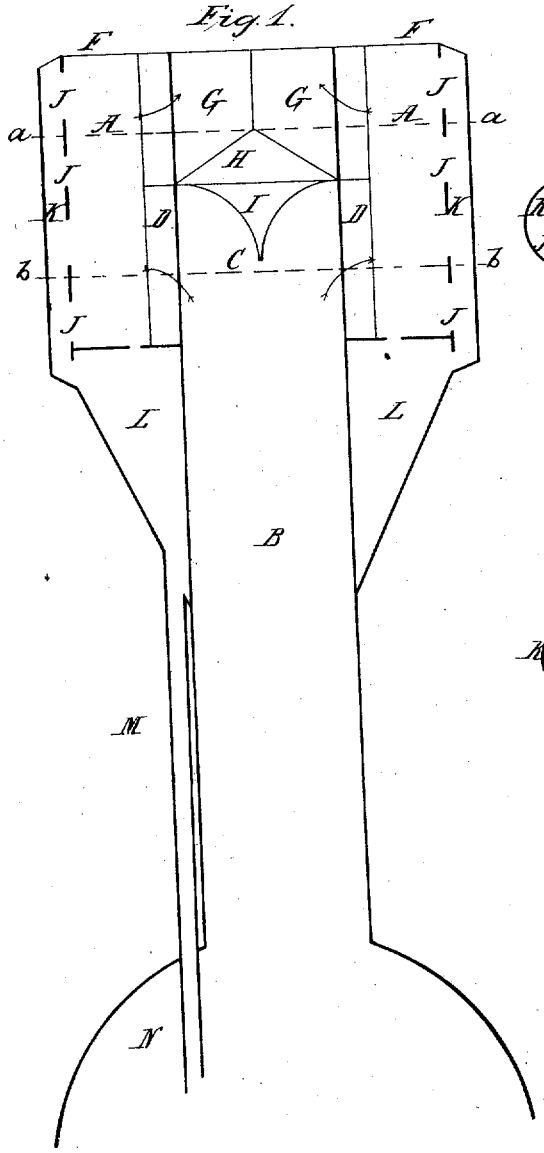
Figure 2:
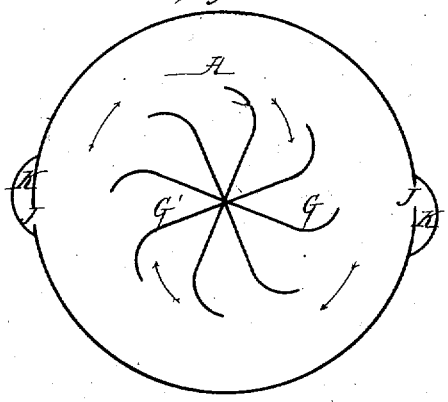
Figure 3:
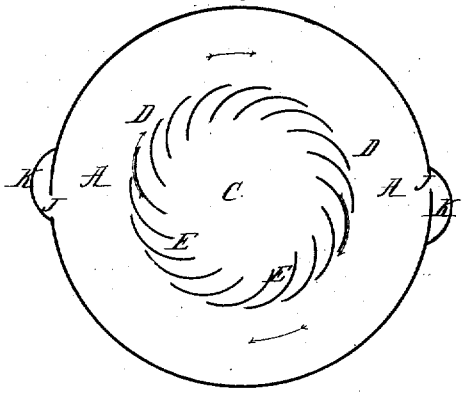

In the drawings annexed, which form part of this specification, Figure 1 is a vertical section of the apparatus cut through its center. Fig. 2 is a transverse section of the same in the line *a a* of Fig. 1. Fig. 3 is a transverse section in the line *b b*.

Similar letters refer to similar parts in all the figures.

I construct the chamber A A, in which the current is made to revolve, usually of a cylindrical form, and so connect it with a pipe or chimney, B, of the common structure as to form a concentric enlargement of the same. Within and concentric with the chamber A is placed another chamber, C, similar in proportions, but much less in dimensions. This last forms, as it were, a part or continuation of the chimney proper. This chamber is closed at the top, while its walls consist of a series of curved slats, D D, forming a succession of tangential openings, E E, through which the current passes from the chimney or smaller chamber, C, to the larger in a tangential direction; hence its rotation within the same. The chamber in which the current revolves is partially closed at the top by a disk, F F, through the center of which is formed a circular opening, for the discharge of the gaseous current, about one-half the diameter of the chamber.

To arrest the rotation of the current immediately over the chamber C and produce a central upward current around which a portion of the gaseous matters and the sparks continue to revolve, I place a series of vertical plates, G G, radiating from the center of the chamber and extending upward to the central opening in the disk. The extreme ends of these plates are slightly curved in a direction the reverse of the curved slats below, and lie within a circle equal in diameter to the chamber C, or opening in the disk above.

H and I are cones, which are intended to aid or facilitate the change of direction in the current, the one above and the other within the chamber C.

To prevent the accumulation of sparks in the chamber of rotation A A, two or more slits or narrow openings, J J, are made in the walls of the same, through which the sparks and particles are thrown off into small exterior chambers or channels, K K, from whence they fall down into the receptacle L L. From the latter I sometimes carry a pipe, M, down into the smoke-box N; or the pipe may be extended downward outside the boiler and left to discharge upon the ground. It will be perceived that, as the sparks and particles have a rapid rotation within the chamber A, they are necessarily kept out against its walls, or are thrown off through the openings J J in the same, while the gaseous current only can reach and pass off at the central opening.

Having thus described the nature of my invention, what I claim as new, and desire to secure by Letters Patent, is—

The combination of the central chamber, C, the series of tangential openings E E, the larger circular chamber, A, furnished with a series of vertical openings, J J, leading into exterior chambers or channels for separating sparks and other particles of matter from the gaseous current discharged from locomotive or other chimneys, substantially in the manner set forth.

WM. C. GRIMES.

Witnesses:

SHERBURNE C. BLODGETT,
J. E. SHAW.